United States Patent [19]
Barkow

[11] 3,911,295
[45] Oct. 7, 1975

[54] WAVEFORM GENERATING CIRCUIT

[75] Inventor: William Henry Barkow, Pennsauken, N.J.

[73] Assignee: RCA Corporation, New York, N.Y.

[22] Filed: Nov. 29, 1974

[21] Appl. No.: 528,372

[52] U.S. Cl. .................... 307/261; 307/321; 328/32
[51] Int. Cl.[2] .................... H03K 5/12
[58] Field of Search ...... 328/32, 142, 208; 307/321, 307/261

[56] References Cited

UNITED STATES PATENTS 3,578,985 5/1971 Edson .................... 307/261

*Primary Examiner*—John Kominski
*Attorney, Agent, or Firm*—E. M. Whitacre; P. J. Rasmussen

[57] ABSTRACT

A sawtooth waveform is coupled to the input terminals of a modified bridge circuit for producing a parabolic current through a load coupled to the output terminals of the bridge. At least one leg of the bridge includes at least two unidirectional conducting devices and means for biasing at least one of the devices for conducting before the other for altering the current slope through the load for more closely approximating a parabolic current waveform.

6 Claims, 10 Drawing Figures

WAVEFORM GENERATING CIRCUIT

BACKGROUND OF THE INVENTION

This invention relates to an improved waveform generation circuit.

In multi-beam display systems, such as utilized in color television receivers, parabolic current waveforms at the line and field scanning rates are often used with suitable apparatus for dynamically converging the beams on the viewing screen of the picture tube. Various types of convergence apparatus are utilized for this purpose. For example, electromagnets disposed around the outside of the tube neck and energized by parabolic currents are used to energize pole pieces within the neck to assert magnetic forces on the beams to converge them. Also, coils may be disposed around the outside of the picture tube and energized by parabolic currents for forming magnetic fields within the tube for positioning the beams. In some instances parabolic currents may energize deflection coils or portions thereof, or coils forming a part of the deflection yoke, for forming magnetic fields for converging the beams.

Pulses and sawtooth waveforms at the line and field scanning rates derived from the line and field deflection circuits often are used as the source of waveforms from which the desired parabolic waveforms are formed. The pulses may be doubly integrated utilizing reactive circuit elements and the sawtooth waveforms may be integrated once for producing the parabolic waveforms. Sometimes the inductance of the coil utilizing the current forms a part of the reactive waveshaping circuit. However, reactive waveshaping circuits frequently require relatively expensive reactive components and the parabolic waveform may not have the desired symmetry, or asymmetry, as the case may be. Sometimes the inductance of the coils utilizing the parabolic currents is too large or too small for forming a part of the integrating waveform circuitry and further reactive circuit elements must be included in the circuit.

It is known that a bridge circuit, such as a diode bridge, may be utilized for forming approximations of parabolic waveforms from sawtooth waveforms. However, prior art waveshaping circuits of this type, unless incorporating relatively expensive additional nonlinear circuit elements such as voltage dependent resistors, may not produce waveforms having the desired curvature or slope.

SUMMARY OF THE INVENTION

A waveform generating circuit comprises a bridge circuit including a pair of input terminals adapted to be coupled to a source of alternating current and a pair of output terminals adapted to be coupled to a load, both legs of the bridge circuit including at least a first unidirectional conducting device poled for conducting current through the load in the same direction through the load during each cycle of the alternating current. Means including a second unidirectional conducting device having a different barrier height voltage than the first device are coupled in at least one of the legs and poled for conducting current in the same direction as the first device in the one leg for providing a load current path around the first device and for biasing the first device for conducting at a different level of load current than the second device.

A more detailed description of the invention is given in the following pages and accompanying drawing of which:

DESCRIPTION OF THE INVENTION

Figure 1:
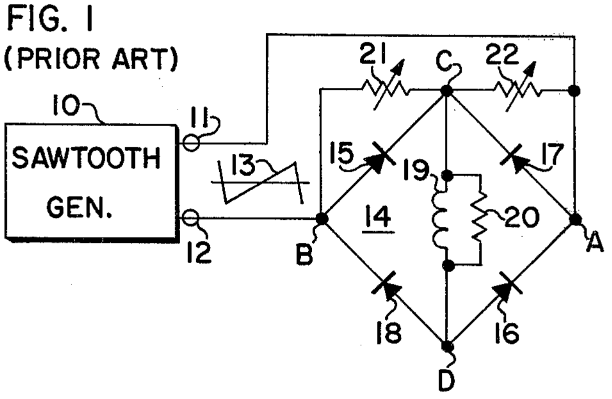
FIG. 1 (PRIOR ART)
FIG. 1 is a circuit diagram of a prior art bridge waveform generator.

FIG. 1 is a circuit diagram of a prior art bridge waveform generator. FIGS. *5a*, *5b* and *5c* illustrate waveforms obtained in the circuit of FIG. 1. A sawtooth generator 10 is coupled to a pair of terminals 11 and 12 of bridge waveform generator circuit 14. The generator supplies a sawtooth waveform 13 which is obtained at the terminal 11 with respect to terminal 12. The bridge circuit 14 includes four diodes 15–18 poled as indicated between bridge input terminals A and B and bridge output terminals C and D. Coupled between output terminals C and D of the bridge is a load inductance 19 shunted by a damping resistance 20. A variable resistor 22 is coupled in shunt with diode 17 between terminals A and C, and a variable resistance 21 is coupled in shunt with diode 15 between terminals B and C. This prior art bridge circuit performs the well-known function of converting a sawtooth current to an approximation of a parabolic current through load inductance 19. To simplify the explanation of the circuit operation, the impedance of inductance 19-resistor 20 will be considered zero, and the voltage drop across each diode will be considered to be equal to the barrier height at all times when each diode is conducting, ignoring the diode nonlinear conduction characteristics.

Assuming that all of diodes 15–18 are of the germanium type, each having a barrier height of about 0.3 volts, the operation of the circuit will be described in conjunction with FIGS. *5a* and *5b*. FIG. *5a* illustrates a voltage sawtooth waveform 30 such as that obtained from sawtooth generator 10. A first leg of the bridge, which conducts during the positive path of the sawtooth waveform illustrated by waveform 30 between $T_0$ and $T_4$, goes from terminal A through diode 17 through the load 19-resistor 20 combination and through diode 18 to terminal B. Diodes 17 and 18 will not conduct until the voltage across terminals A and B is greater than the combined barrier heights of the diodes, or, approximately 0.6 volts. It is noted that resistors 21 and 22 form a continuous current path between terminals A and B. Depending on the resistance setting of these resistors, either diode 17 or 18 could conduct before the other if the voltage developed across resistor 22 or 21 exceeded the barrier height of the diode 17 or 18. However, this condition is ignored in all of the FIGURES and for purposes of a simple explanation, it is presumed and illustrated that diodes 17 and 18 normally begin conduction at the same time. Thus, as illustrated by the current waveform 31 in FIG. *5b*, load current does not flow from time $T_0$ to $T_1$, which corresponds to a bridge input sawtooth voltage of +0.6 volts. At $T_1$ diodes 17 and 18 are forward biased and load current flows through these diodes and load 19. This load current has a slope determined by the impedance of the circuit and which is considered a constant during the time $T_1 - T_4$.

During the period of time when voltage waveform 30 is negative, diodes 15 and 16 will conduct load current when the voltage across terminals B and A reaches 0.6 volts. This occurs at time $T_1'$, at which time diodes 15 and 16 conduct through the interval $T_4'$. Similarly, the slope of current waveform 31 is considered constant during this period, as determined by the impedance of the circuit. Resistances 21 and 22 provide a shunt path around load 19 even when none of diodes 15–18 are conducting. Thus, the input terminals A and B of bridge 14 may be placed in series with, for example, deflection coils and current will flow at all times through the coils. The amount of resistance of resistances 21 and 22 will determine the current through load 19. As previously stated, it is presumed that diodes 17 and 18, and 15 and 16, respectively, will start to conduct load current simultaneously. Resistance 20, shunting load 19, serves to damp the current in the load during the interval $T_1' - T_1$ when none of the diodes 15–18 is conducting. As indicated in FIG. *5b*, the load current approximates a parabola, but with only a single slope breakpoint during each of the waveform halves $T_0 - T_4$ and $T_0 - T_4'$. This approximation may not be suitable for many purposes.

It is noted that in all of FIGS. *5b–5f* the driving voltage waveform 30 of FIG. *5a* is a scanning waveform such as obtained from a television deflection generator, which waveform defines a trace period $T_4' - T_4$, and a retrace period $T_5' - T_4'$, or $T_4 - T_5$. For purposes of discussing these circuits, the effect of the bridge waveform generator is shown during the trace period only and no attempt has been made to illustrate accurately the load current during the retrace period because, for most purposes, the television viewing screen is blanked during the retrace interval and the effect of the convergence circuits is inconsequential.

FIG. *5c* illustrates the current through load 19 when diodes 15–18 of FIG. 1 are all of the silicon type, each having a barrier height voltage of approximately 0.7 volts. With silicon type diodes, the operation of the bridge circuit 14 of FIG. 1 is the same as with germanium type diodes as described above, except that there is no conduction of the bridge and, hence, no current through load 19 until the driving sawtooth voltage waveform develops approximately 1.4 volts across the bridge. The deficiency of the bridge circuit employing silicon diodes is the same as that described for the bridge circuit employing germanium type diodes; there is only a single breakpoint in the current slope in each half of the waveform interval, which approximation of a parabolic current may not be suitable for many purposes.

Figure 2:
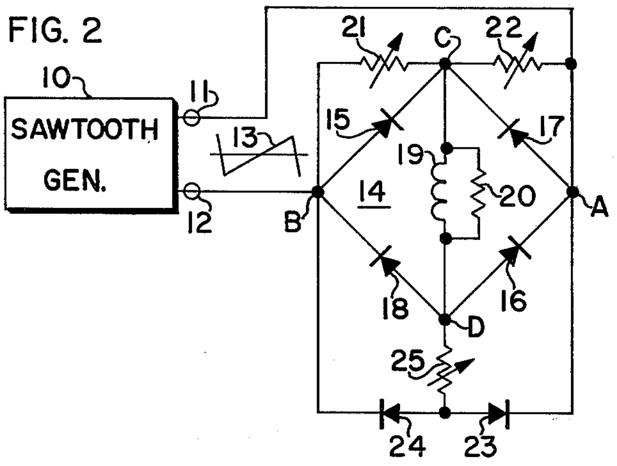
FIGS. 2–4 are circuit diagrams of three embodiments of improved bridge waveform generators according to the invention; and FIGS. *5a*–*5f* illustrate waveforms obtained in the various waveform generators of FIGS. 1–4.
Figure 3:
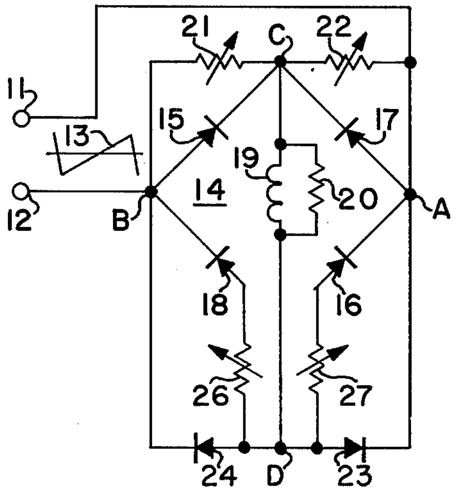
Figure 4:
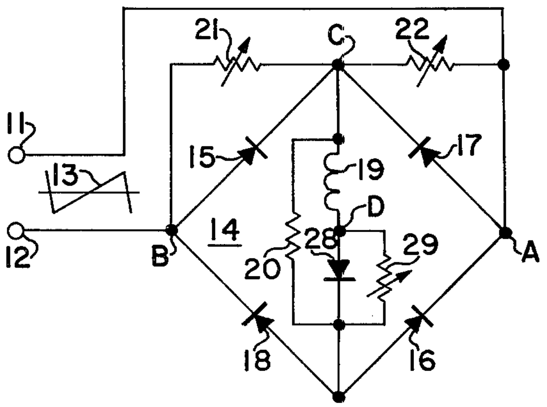

FIGS. 2–4 are circuit diagrams of improved brdige waveform generating circuits embodying the invention. Those elements in FIGS. 2–4 performing similar functions to their counterparts in FIG. 1 are numbered the same as in FIG. 1.

FIG. 2 differs essentially from FIG. 1 in that a serially coupled resistor 25 and diode 23 are in shunt with diode 16 between terminals D and A and serially coupled resistance 25 and a diode 24 are in shunt with diode 18 between terminals D and B of bridge 14. In the illustrated embodiment diodes 15, 17, 23 and 24 are germanium and diodes 16 and 18 are silicon. When the voltage at terminal A is +0.6 volts with respect to terminal B, diodes 17 and 24 are forward biased and current flows from terminal A through diode 17, resistor 22, load 19, resistance 20, resistance 25, diode 24 and resistance 21 to terminal B. This load current is illustrated by current waveform 33 of FIG. 5d in the interval $T_0 - T_2$. When the current in this path increases such that the voltage drop across diode 24 and resistance 25 equals 0.7 volts, silicon diode 18 becomes forward biased and conducts, diverting some of the load current from resistance 25 and diode 24. This lower resistance path of diode 18 in parallel with resistance 25 and diode 24 causes the load current to have a steeper slope, as illustrated by waveform 33 during the interval $T_2 - T_4$. Thus, resistance 25 and diode 24 provide a path for load current around diode 18 and bias diode 18 for conduction at a different level of load current than diode 17. This results in current breakpoints at both $T_1$ and $T_2$, which additional breakpoint causes the load current to more closely approximate a parabola.

The other leg of the bridge, comprising diode 15, load 19 and the combination of diode 16 in parallel with resistance 25 and diode 23, functions similar to the first leg, but operates during that portion of sawtooth voltage waveform 30 when input terminal B is positive with respect to input terminal A.

Figures 5A, 5B, 5C, 5D, 5E, 5F:
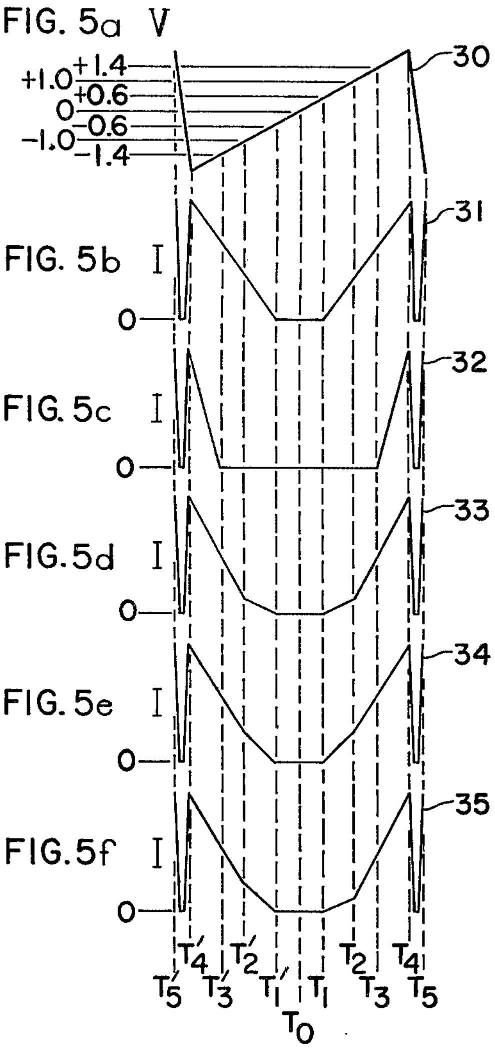

FIG. *5e* illustrates a load current waveform 34 obtained in FIG. 2 when resistance 25 is adjusted to a lower value than it was when current waveform 33 of FIG. 5d was produced. With a lower resistance, more current must pass through resistance 25 and diode 24 before diode 18 becomes forward biased and conducts. Therefore, resistance 25 performs a waveshaping function and determines the slope of the current and the level of current at the breakpoints at $T_2$ and $T_2'$.

The only constraint in practicing the invention in this embodiment is that the diode forming part of the shunt path around the conventional bridge diode have the lower barrier height. That is, for example, if diode 18 is silicon, then diode 24 should be germanium.

Further, diodes 15 and 17 could be removed from the bridge, if the losses across resistors 21 and 22 could be tolerated, without affecting the waveshaping capabilities of the circuit.

FIG. 3 is a circuit diagram of another embodiment of the invention which differs from FIG. 2 essentially in that resistance 25 is replaced by two resistances 26 and 27. Thus, a first leg of the bridge circuit includes diode 17, load 19, and diode 24 in shunt with resistance 26 and serially coupled diode 18 and would pass load current when terminal A is at a positive voltage level with respect to terminal B. The other leg of the bridge includes diode 15, load 19 and diode 23 in shunt with resistance 27 and serially coupled diode 16 and would pass load current when the voltage level at terminal B is positive with respect to terminal A.

The embodiment of FIG. 3 permits the impedance of each bridge leg to be adjusted individually. Thus, the current level at which the parabolic waveform breakpoints occur may be adjusted differently on either side of $T_0$ as illustrated by current waveform 35 of FIG. *5f.* This arrangement provides for even greater waveshaping capabilities of the circuit.

Diodes 15 and 17 may be removed from the circuit, leaving respective resistors 21 and 22 as part of the respective bridge legs. In FIG. 3, diodes 23 and 24 are silicon, and diodes 16 and 18, forming part of the respective load current paths around the former, are germanium.

FIG. 4 is a circuit diagram of another embodiment of the invention. A diode 28 and parallel coupled variable resistance 29 are serially coupled with the load between terminal D and the junction of the anode of diodes 16 and 18. Resistor 20 shunts load 19 and diode 28 so there is a relatively low resistance path across the load 19 to damp any oscillations when the bridge legs are not conducting. In FIG. 4, diodes 15–18 are germanium, and diode 28 silicon. Once diodes 17 and 18, or 15 and 16, become forward biased, load current would flow downward through load 19 and resistance 29. When the current through resistance 29 reaches a level at which a voltage is developed across resistance 29, which would forward bias diode 28, diode 28 would conduct, providing a lower impedance circuit and hence increasing the slope of the load current. A main advantage of FIG. 4 is that only five diodes are utilized instead of six, or only three diodes if diodes 15 and 17 were removed from the circuit, with no decrease in the number of breakpoints in the parabolic load current waveform compared to the FIGS. 2 and 3 embodiments.

All of the embodiments of FIGS. 2–4 provide for flexible waveshaping of the parabolic load current by providing additional current slope breakpoints which are asymmetric with respect to a center timebase reference of the alternating current input waveform or at different current levels on either side of the center timebase reference. It is noted that both legs of the improved bridge circuits provide for direct current flow from the source of input waveforms. Thus, no reactive waveshaping elements are required. Further, the direct current conduction paths of the bridge permit the bridge to be inserted in series with the deflection coils of a television receiver as there are no reactive current elements utilized for distorting the scanning current. This is assuming, of course, that the inductive load 19 is mainly resistive at the energizing current frequency. should this not be the case, the input terminals of the bridge circuit may be placed in parallel with a source of sawtooth waveforms.

What is claimed is:

1. A waveform generating circuit comprising:

a bridge circuit including a pair of input terminals adapted to be coupled to a source of alternating current and a pair of output terminals adapted to be coupled to a load, both legs of said bridge circuit including at least a first unidirectional conducting device poled for conducting current through said load in the same direction therethrough during each cycle of said alternating current; and means including a second unidirectional conducting device having a different barrier height voltage than said first device coupled to said first device in at least one of said legs and poled for conducting current in the same direction as said first device in said one leg for providing a load current path around said first device and for biasing said first device for conducting at a different level of load current than said second device.

2. A waveform generating circuit according to claim 1 wherein said means comprises a series connected resistance and said second unidirectional conducting device coupled in parallel with said first device, said second device having a smaller barrier height voltage than said first device.

3. A waveform generating circuit according to claim 2 wherein said series resistance is common to both legs of said bridge and wherein both legs of said bridge include a second unidirectional conducting device.

4. A waveform generator according to claim 2 wherein each of said legs includes a resistance serially coupled with said second device in each leg.

5. A waveform generating circuit according to claim 2 wherein said load comprises an inductance serially coupled with said second device and damping means are coupled across said load.

6. A waveform generating circuit according to claim 1 wherein each of said legs coupled between said input terminals comprises a direct current path.

* * * * *